US006044538A

United States Patent [19]

Grall et al.

[11] Patent Number: 6,044,538

[45] Date of Patent: Apr. 4, 2000

[54] PASSIVE MICROWAVE STRUCTURES AND METHODS HAVING REDUCED PASSIVE INTERMODULATION

[75] Inventors: Michael J. Grall, Lawndale; Lee E. Coleman, Fullerton; Ronald M. Campbell, Habor City, all of Calif.

[73] Assignee: Hughes Electronics Corporation, El Segundo, Calif.

[21] Appl. No.: 09/057,945

[22] Filed: Apr. 9, 1998

Related U.S. Application Data

[62] Division of application No. 08/699,748, Aug. 20, 1996, Pat. No. 5,834,993.

[51] Int. Cl.[7] .................................................. B23P 15/00

[52] U.S. Cl. ............................................ 29/447; 29/428

[58] Field of Search ...................... 29/447, 428; 333/202

[56] References Cited

U.S. PATENT DOCUMENTS

| | | |
|---|---|---|
| 1,981,334 | 11/1934 | Schmalz . |
| 3,371,413 | 3/1968 | Rundle . |
| 3,643,502 | 2/1972 | Birkholtz . |
| 3,714,606 | 1/1973 | Friend . |
| 3,928,167 | 12/1975 | Buoy et al. . |
| 4,001,928 | 1/1977 | Schweiso . |
| 4,015,319 | 4/1977 | Levine . |
| 4,074,407 | 2/1978 | Christensen . |
| 4,126,758 | 11/1978 | Krumme . |
| 4,293,942 | 10/1981 | Raumgartner . |
| 4,327,165 | 4/1982 | Kuhl . |
| 4,628,283 | 12/1986 | Reynolds . |
| 4,648,124 | 3/1987 | Mantovani et al. . |
| 4,850,095 | 7/1989 | Akao et al. . |
| 5,299,349 | 4/1994 | Seibig . |
| 5,456,779 | 10/1995 | Sinha . |
| 5,818,314 | 10/1998 | Baker . |
| 5,834,993 | 11/1998 | Grall et al. . |

FOREIGN PATENT DOCUMENTS

| | | | |
|---|---|---|---|
| 518595 | 11/1955 | Canada | 29/447 |
| 0223925 | 6/1987 | European Pat. Off. | 29/447 |
| 2532035 | 1/1977 | Germany . | |
| 02071595 | 3/1990 | Japan . | |

*Primary Examiner*—Irene Cuda
*Attorney, Agent, or Firm*—Georgann S. Grunebach; M. W. Sales

[57] ABSTRACT

A simple joining process for members of passive microwave structures is described which reduces passive intermodulation. The process forms an aperture in a first member and forms a second member to have dimension which exceeds the aperture dimension by a dimension differential. The members are joined by initially causing them to have a temperature differential that is sufficient to permit the second member to be positioned across the aperture. The dimension differential is selected to generate mutually-induced radial stresses in the members, after the temperature differential is removed, which enhance the metal-to-metal contact between the members and, thereby, improve passive intermodulation (PIM) performance. Preferably, the dimension differential is selected to cause the second member to elastically buckle and exert a buckling stress against the first member. Additional interface structures are provided to resist operational axial forces, e.g., vibration, that tend to dislodge the members.

4 Claims, 3 Drawing Sheets

PASSIVE MICROWAVE STRUCTURES AND METHODS HAVING REDUCED PASSIVE INTERMODULATION

This is a divisional of U.S. application Ser. No. 08/699,748, filed Aug. 20, 1996, now U.S. Pat. No. 5,834,993.

BACKGROUND OF THE INVENTION

1. Field of the Invention

The present invention relates generally to passive microwave structures.

2. Description of the Related Art

Intermodulation distortion results from nonlinearities in the transmission function of an electronic device and is characterized by the appearance of signals in the device output whose frequencies are equal to the sums and differences of the input signal frequencies. In particular, if two signals having frequencies $f_1$ and $f_2$ are processed through a nonlinear device, e.g., a diode or a transistor, the device output will include intermodulation products whose frequencies are $nf_1 \pm mf_2$, in which n and m are integers.

Because these intermodulation products are spread across a wide frequency range, some of them often fall in a frequency band of interest, e.g., third order products (in which n+m=3) lie close to amplified versions of the input signals and are therefore difficult to remove by filtering. Accordingly, extensive efforts have been directed to reducing the presence of intermodulation products in signal bands (e.g., by reducing the amplitude of the products and/or by properly positioning the frequency of the products in relation to the signal band).

It was once thought that intermodulation products were only produced by active devices. However, it has been found that passive microwave structures which are generally considered to be linear, e.g., filters, waveguides, waveguide-based components (such as couplers) and enclosures, also exhibit intermodulation distortion. Because it is generated in passive microwave structures, this type of intermodulation distortion is typically referred to as passive intermodulation (PIM).

Various investigations (e.g., see Chapman, R. C., et al., "Intermodulation Generation in Normally Passive Linear Components; Section 1.0—IM Generation", US Army Satellite Communications Agency Study Report WDL-TR5242, Aug. 24, 1973) have discovered that the sources of PIM include a) microdischarge at contacting points of metallic joints, b) nonlinear contact impedance due to oxide layer tunneling, c) space charge limited current flow through oxide films and d) water vapor absorptive and dispersive effects.

It has been found that PIM effects are reduced when metallic members of microwave passive structures are coupled by the joining processes of welding or brazing. However, welded and brazed parts cannot easily be assembled and disassembled. In addition, welded joints are susceptible to developing cracks which are PIM generators and it is difficult to control warpage in brazed assemblies.

It has also been shown (e.g., see Rootsey, J. V., et al., "Intermodulation Study (Intermodulation Products—Satellite Ground Antennas); Section 1.0—Introduction and Section 2.0—Conclusions and Recommendations", US Army Satellite Communications Agency Study Report AD-785711, Aug. 24, 1973) that another joining process in the form of bolted joints reduces PIM when these joints include a) the use of relatively soft materials, e.g., aluminum, b) mating surfaces which are sufficiently smooth, c) mating parts which are sufficiently thick to reduce bending and d) bolt spacing which is sufficiently small. In general, these bolted joints reduce PIM by inducing stresses in opposing surfaces that are sufficient to reduce PIM generating sources, e.g., intersurface oxide films. Unfortunately, bolted joints increase the weight, size, fabrication cost and assembly time of passive microwave structures.

SUMMARY OF THE INVENTION

The present invention is directed to passive microwave structures which reduce PIM effects and which are lightweight, spatially economic, easily fabricated and easily assembled.

These passive structures are realized with a process for joining first and second structure members that includes an initial step of providing the first member with an aperture that is smaller than the second member by a dimension differential. The members are then joined by first causing them to have a temperature differential that is sufficient to permit the second member to drop into the aperture, i.e., be positioned across the aperture. The temperature differential is then removed.

The dimension differential is selected to be sufficient to create mutually-induced radial stresses in the first and second members (after the temperature differential is removed) which enhance the metal-to-metal contact between the members and thereby reduce PIM.

Preferably, the dimension differential is selected to be sufficient to elastically buckle the second member and thereby cause the second member to exert a buckling stress against the periphery of the aperture.

In one embodiment, the first member is a housing and the second member is a lid. A groove is formed in the periphery of the lid and the periphery of the aperture is wedged into the groove by the mutually-induced radial stresses. This structure reduces the interface area between the lid periphery and the aperture periphery and thereby further enhances the reduction of PIM. It also increases the resistance to operational axial forces, e.g., vibration, that tend to dislodge the lid 24 from the aperture 28.

In a second embodiment, these advantages are obtained with a slanted aperture periphery and a lid periphery that has a beveled edge and a lip. The beveled edge abuts the slanted aperture perhiphery to generate mutually-induced radial stresses that enhance PIM performance. Together, the slanted aperture periphery and the lip increase the resistance to operational axial forces that tend to dislodge the lid.

The structural teachings of the invention can be adapted to form various microwave passive structures, e.g., enclosures and filters.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
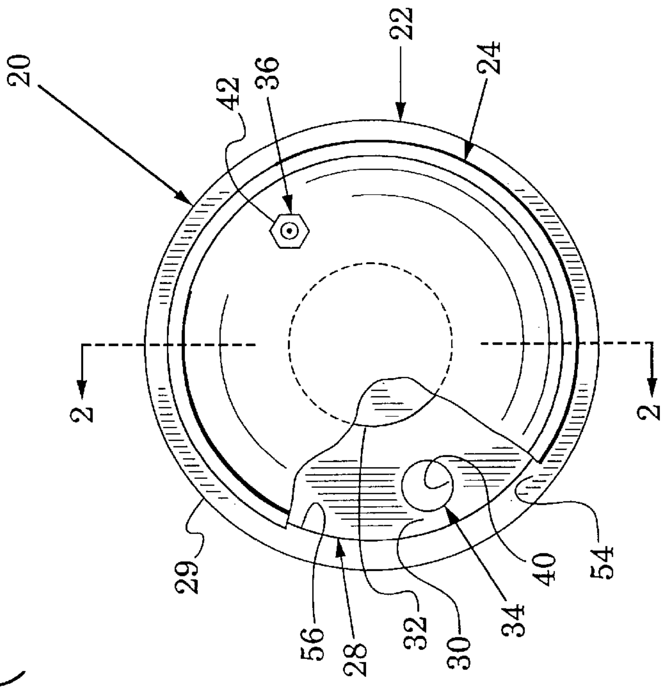
FIG. 1 is a plan view of a microwave filter in accordance with the present invention.
Figure 2:
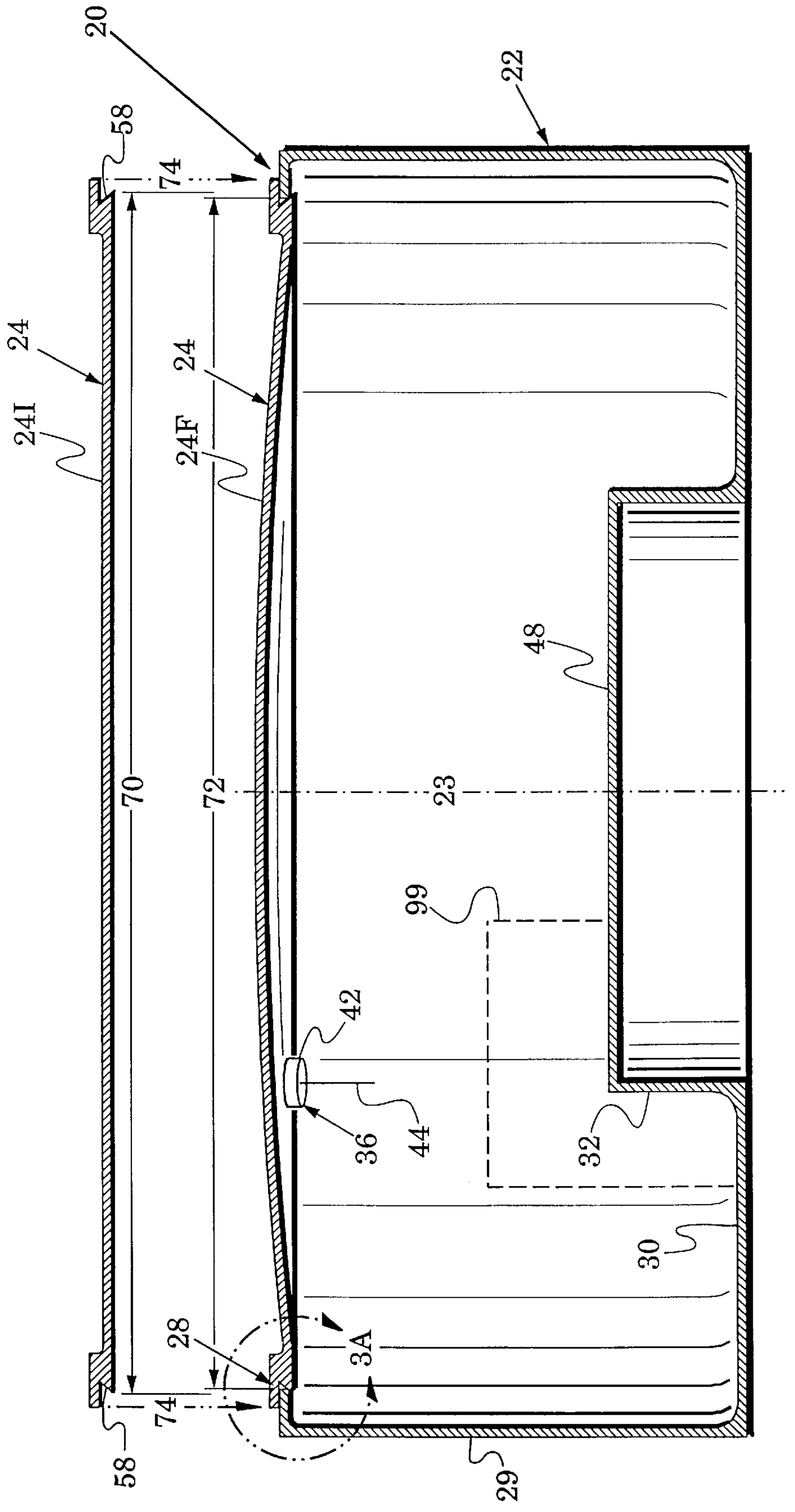
FIG. 2 is a view along the plane 2—2 of FIG. 1, the view is rotated ninety degrees.

FIGS. 1 and 2 illustrate a passive microwave structure in the form of a microwave filter 20. The filter 20 includes a cylindrical housing 22 which is formed about an axis 23 and a lid 24 which is positioned across an aperture 28 of the housing 22. The housing 22 has a cylindrical wall 29 and, opposite the aperture 28, a transverse floor 30. The housing 22 also includes a cylindrical filter stub 32 which extends upward from the transverse floor 30, is generally coaxially arranged with the housing 22 and is directed towards the lid 24.

The filter 20 also includes first and second access ports 34 and 36 which provide signal access to the interior of the housing 22. The first access port 34 is a hole 40 in the floor 32 which can receive a radiative and/or receptive element, e.g., an antenna feed structure, and the second access port 36 is a microwave coaxial connector 42 which has a center conductor that extends into the housing 22 to form a coupling probe 44.

Although the housing 22 can be easily formed as an integral member, e.g., by machining, it is impossible (or prohibitively expensive) to form the filter 20 of a single member. Accordingly, such passive microwave structures have conventionally been formed of separate members which are then joined by a conventional joining process, e.g., welding, brazing or bolting.

In contrast, the housing 22 and lid 24 of the microwave filter 20 are joined, in accordance with the present invention, by the action of mutually-induced stresses which are developed in abutting peripheries of the lid 24 and the housing 22. A full description of these joining structures and methods will be enhanced by preceding it with the following operational description of the filter 20.

The general shape of the filter 20 forms a conventional coaxial resonator which is dimensioned to resonate for signals having a predetermined wavelength $\lambda_{res}$. Accordingly, the length of the housing 22 along its axis 23 is nominally $\lambda_{res}/4$. The space between the end 48 of the coaxial stub 32 and the lid 24 forms a capacitance which loads the resonator. This loading along with loading from the first and second access ports 34 and 36 generally shortens the length of the housing in specific filter structures, e.g., to a length on the order of $\lambda_{res}/6$.

In operation of the filter 20, microwave transmission between the first and second access ports 34 and 42 is enhanced for signals having the predetermined wavelength $\lambda_{res}$ and is increasingly attenuated as the wavelength changes from $\lambda_{res}$ (at an attenuation rate determined by the quality factor Q of the filter). Accordingly, the microwave filter 20 is especially suited for use as a bandpass filtering element for a variety of microwave systems, e.g., a satellite repeater.

Figure 3A:
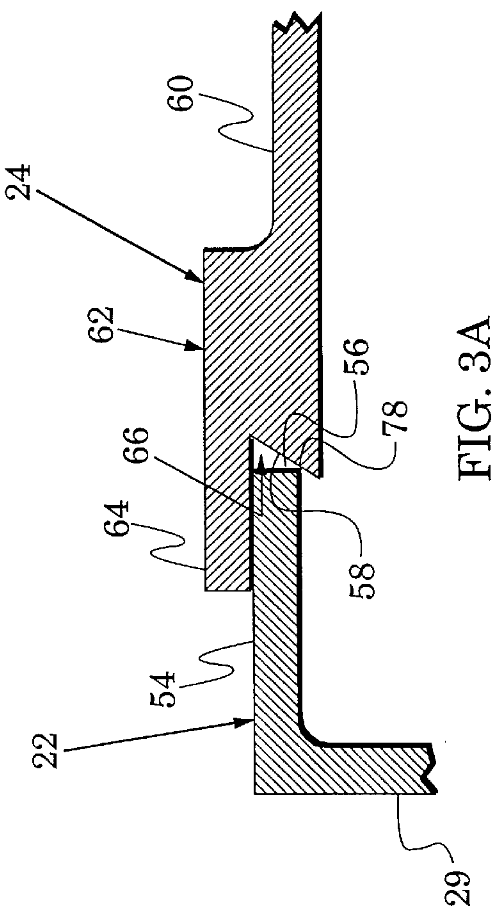
FIG. 3A is an enlarged view of a periphery interface structure within the curved line 3A of FIG. 2.

Returning attention now to the joining structures and methods of the invention, the enlarged view of FIG. 3A shows that the upper end of the cylindrical wall 29 of the housing 22 has an inward-directed rim 54 which terminates to form a periphery 56 of the aperture (28 in FIGS. 1 and 2). The lid 24 has a corresponding lid periphery 58 and the lid is positioned into the aperture 28 with its lid periphery 58 abutting the aperture periphery 56. The lid 24 has a thin, central web 60 which thickens adjacent the periphery 58 to form an annular rim 62. The rim 62 includes an annular lip 64 which extends outward over the periphery 56 of the aperture 28. The lid periphery 58 is slanted inward from its bottom to its top to form a groove 66 in association with the lip 64.

FIG. 2 shows the lid 24 in an initial configuration 24I before installation into the housing 22 and in a final configuration 24F after its installation. In its preinstalled configuration 24I, the lid 24 has a lid dimension 70 across the lid, i.e., across opposite sides of the lid periphery 58 to where it abuts the aperture periphery 56 in FIG. 3A. Similarly, the aperture 28 has an aperture dimension 72 across the aperture 28, i.e., across opposite sides of the aperture periphery 56. In accordance with a feature of the invention, the lid dimension 70 exceeds the aperture dimension 72 by a dimension differential.

In a joining operation of the invention, the housing 22 and lid 24 are caused to have a temperature differential. The temperature differential is selected to expand the housing 22 and shrink the lid 24 sufficiently to permit the lid 24 to be placed into the aperture 28, i.e., positioned across the aperture 28 with the lid periphery 58 within the aperture periphery 56. This positioning operation is indicated in FIG. 2 by the positioning arrows 74.

The temperature differential is then removed so that the lid 24 expands and the housing 22 shrinks. The dimension differential between the lid dimension 70 and the aperture dimension 72 is selected to cause the lid periphery 58 to then abut the aperture periphery 56 and create mutually-induced radial stresses in the lid 24 and the housing 22. These stresses wedge the aperture periphery 56 into the groove 66 as shown in FIG. 3A. Preferably, the dimension differential is selected to be sufficient to elastically buckle the lid 24 into its final configuration 24F of FIG. 2 and thereby cause the lid periphery 58 to exert a buckling stress against the aperture periphery 56.

Conventional stress theory (see, for example, Young, Warren G., *Roark's Formulas for Stress and Strain*, McGraw-Hill Publishing, New York, sixth edition, 1989) teaches that a circular disc (similar to the lid 24) having a radius $\alpha$ (one half of the lid dimension 70) and a thickness t (substantially the thickness of the lid's central web 60) will elastically buckle at a critical buckling stress $f_{cr}$ of $$f_{cr} = 0.35\frac{E}{1-v^2}\left(\frac{t}{\alpha}\right)^2 \tag{1}$$

in which E is Young's Modulus and v is Poisson's Ratio. Stress theory further teaches that the stress in such an elastically buckled disc remains substantially at the critical buckling stress $f_{cr}$. Thus, the periphery of the disc urges outward (against whatever structure is causing the buckling) with a stress substantially that of the critical buckling stress $f_{cr}$.

In an exemplary filter prototype, the lid 24 and the housing 22 of FIGS. 1, 2 and 3A were formed from 6061-T6 aluminum. The lid 24 was fabricated with a lid dimension 70 of 9.144 centimeters and a thickness (in the web 60) of 0.51 millimeter. When these dimensions are substituted into equation (1), it is found that the buckling stress is ~$3.3\times10^6$ newtons per square meter.

In the prototype, the aperture 28 was formed with an aperture dimension 72 of 9.1643 centimeters. Thus, the lid dimension 70 exceeded the aperture dimension 72 by a dimension differential of ~0.2 millimeter. The housing 22 was heated to ~94 degrees Centigrade and the lid 24 was cooled to ~−168 degrees Centigrade (with the aid of liquid nitrogen). This temperature differential was sufficient to permit the lid 24 to be positioned into the aperture with the lid periphery within the aperture periphery. The temperature differential was then removed and the dimension differential was sufficient to cause the lid to elastically buckle and exert a buckling stress against the aperture periphery.

To further increase the mutually-induced radial stresses between the lid periphery 58 and the aperture periphery 56, these peripheries were formed as shown in FIG. 3A so that a corner 78 of the aperture periphery 56 abutted the lid periphery 58. This structure reduces the interface contact area to that of the corner 78. It was estimated that this corner initially had a width of ~0.025 millimeter. The mutually-induced stresses at the periphery interface were therefore increased by the ratio of the web thickness to the corner thickness or 0.51/0.025 which is a ratio of ~20.4 so that the mutually-induced stresses were $\sim 68\times10^{6}$ newtons per square meter.

This stress caused some deformation of the corner 78 with a consequent increase in its interface area. Although this resulted in a final interface stress somewhat less than calculated above, the mutually-induced stresses in the abutting lid periphery 58 and aperture periphery 56 were found to obtain favorable PIM results. For example, with two 15 watt signals inserted into this prototype filter, it was found that the 13th order intemodulation products (i.e., n+m=13) were greater than 115 dB below the inserted signal power.

It is thought that this level of PIM performance is obtained because the high level stresses enhance the metal-to-metal contact which reduces some of the theorized causes of PIM that were discussed above in the related art section, e.g., intersurface oxide films.

In FIG. 3A, the lip 64 extends outward over the aperture periphery 56 and the aperture periphery 56 is wedged into the groove 66 by the mutually-induced stresses. This structure increases the stability of the lid 24 and housing 22 interface. Although the mutually-induced radial forces between the lid and the housing have been found to effectively reduce PIM, they alone may not adequately resist operational axial forces, e.g., vibration, that tend to dislodge the lid 24 from the aperture 28. This resistance is enhanced with the periphery 56 wedged into the groove 66. At the same time, this structure forms the abutting relationship between the corner 78 and the lid periphery 58 that reduces PIM.

Figure 3B:
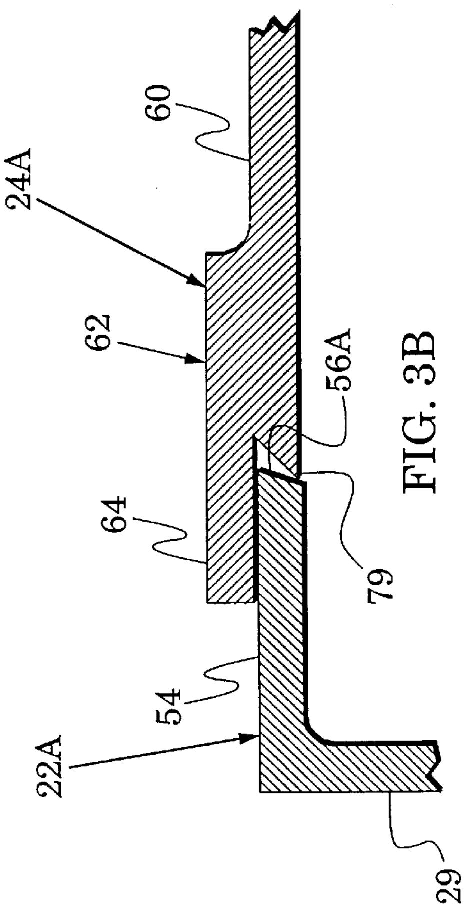
FIG. 3B is a view similar to FIG. 3A which shows another periphery interface structure.

FIG. 3B illustrates another embodiment of the housing and lid interface structure. This figure is similar to FIG. 3A with like elements indicated by like reference numbers. However, the housing 22 is modified to a housing 22A in which the aperture periphery 56 is slanted to become an aperture periphery 56A. Also the lid 24 is modified to a lid 24A which has a lid periphery in the form of a beveled edge 79 that is abutted by the aperture periphery 56A.

Thus, the periphery abutment area in FIG. 3B is reduced to that of the sharp edge of the beveled edge 79 in a reduction manner similar to that obtained with the sharp corner 78 in the housing and lid structure of FIG. 3A.

The beveled edge 79 and slanted aperture periphery 56A restrain the lid 24A from moving upward and the lip 64 restrains the lid 24A from moving downward. Similar to the structures of FIG. 3A, e.g., the groove 66, these combined structures insure that the lid 24A will not move vertically out of the aperture 28 under the influence of operational forces such as vibration.

Another exemplary filter prototype was fabricated with the housing and lid structure of FIG. 3B. PIM tests on this prototype yielded PIM results which were substantially equivalent to the improved PIM results discussed above with reference to the housing and lid structure of FIG. 3A.

The passive microwave structures of FIGS. 1, 2, 3A and 3B have been demonstrated to reduce PIM. In addition, their highly stressed metal-to-metal interfaces also cause them to be well suited for microwave shielding applications, i.e., reducing microwave leakage into or out of microwave circuits. Accordingly, the teachings of the invention are particularly suited for realizing any passive microwave structure with the features of low PIM and high microwave isolation.

Figure 4:
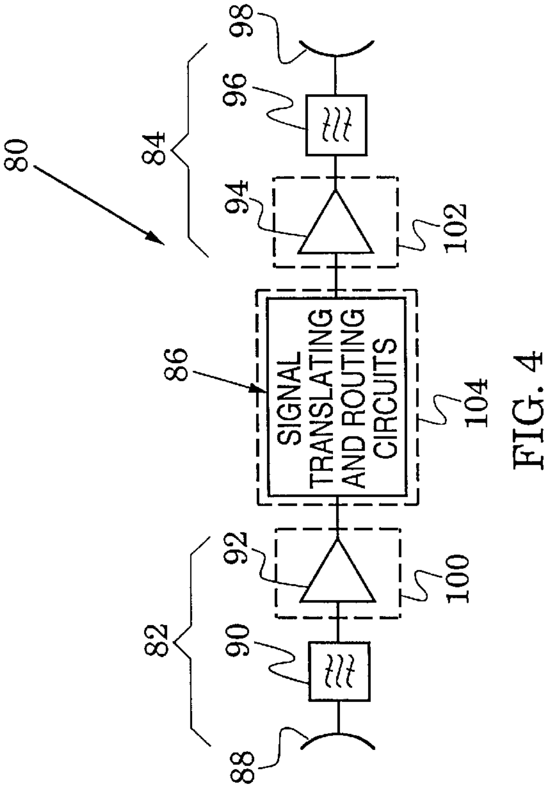
FIG. 4 is a block diagram of a satellite repeater which can include the filters of FIGS. 1, 2, 3A and 3B.

For example, the microwave filter 20 can be used in input and output circuits of a microwave satellite repeater 80 as shown in FIG. 4. The repeater 80 includes a receiver 82 and a transmitter 84 which are coupled by signal translating and routing circuits 86. The receiver 82 has a receive antenna 88, a bandpass receive filter 90 and a low-noise amplifier 92. The transmitter 84 has a power amplifier 94, a bandpass transmit filter 96 and a transmit antenna 98.

In a typical repeater operation, the repeater 80 receives a plurality of signals in a receive frequency band through its receive antenna 82. The signals are filtered through the bandpass receive filter 90 and amplified by the low-noise amplifier 92. The received signals are translated in frequency to a transmit frequency band where they are also routed to occupy predetermined frequency slots. The translated and routed signals are then amplified in the power amplifier 94, filtered by the transmit filter 96 and radiated through the transmit antenna 98.

The filter 20 is especially suited for use as the receive filter 90 and the transmit filter 96. When used in association with the receive antenna, for example, a feed structure of the receive antenna 88 would be coupled into the first access port 34 and the second access port 36 would be coupled, e.g., by a coaxial cable, to the low-noise amplifier 92.

The filtering characteristics required by a particular repeater may require several resonator stages for each of the filters 90 and 96 of FIG. 4, e.g., four stages. Accordingly, these filters would be formed with a corresponding number of the filter 20 of FIGS. 1 and 2 which are serially connected. This serial connection between resonator stages can be made, for example, through a coupling window 99 (as shown in broken lines in FIG. 2). The window 99 is in the housing's wall 29 and preferably adjoins the transverse floor 32. Each window 99 thus couples microwave energy between resonator stages and the first and second access ports 34 and 36 would be positioned in input and output stages of the multistage filter.

The passive microwave structures of FIGS. 1, 2, 3A and 3B are also suited for use in other microwave elements of the repeater. For example, the housing and lid structures of FIGS. 1, 2, 3A and 3B can be adapted (by removing the coaxial stub 32 and suitably configuring the overall shape) to form a low-noise amplifier enclosure 100 as indicated by broken lines in FIG. 4. Similar enclosures 102 and 104 are indicated by broken lines in FIG. 4 for respectively the power amplifier 94 and the signal translating and routing circuits 86. These enclosures can be equipped with suitable input and output ports, e.g., coaxial connectors similar to the connector 42 of FIG. 1. In a similar manner, the teachings of the invention can be applied to member joining processes in other passive microwave structures, e.g., waveguides and waveguide-based components.

The passive microwave structures of the invention have been shown by prototype tests to effectively reduce PIM. The structures are lightweight, spatially economic and eliminate many of the negative features of conventional joining techniques, e.g., the warpage of brazing, the cracking of welding and the size, weight and time-consuming assembly of bolting.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of reducing passive intermodulation in a microwave filter, comprising the steps of:

providing a microwave housing and a microwave stub within said housing wherein said housing and said stub are arranged and dimensioned to resonate for microwave signals of a predetermined wavelength;

providing an aperture in said housing wherein said aperture has an aperture periphery and an aperture dimension across said aperture;

providing a lid that has a lid periphery and a lid dimension across said lid which exceeds said aperture dimension by a dimension differential;

providing one of said aperture periphery and said lid periphery with a beveled edge;

providing the other of said aperture periphery and said lid periphery with a slanted face;

causing said housing and said lid to have a temperature differential that is sufficient to permit said lid to be positioned across said aperture with said lid periphery within said aperture periphery;

removing said temperature differential; and selecting said dimension differential to be sufficient, when said temperature differential removing step is completed, to abut said beveled edge and said slanted face and elastically buckle said lid to thereby generate mutually-induced stresses in said housing and said lid that reduce passive intermodulation.

2. The method of claim 1, further including the step of providing one of said housing and said lid with a lip that extends over the other of said housing and said lid and, thereby, enhances the retention of said lid in said aperture.

3. A method of reducing passive intermodulation in a microwave filter, comprising the steps of:

providing a microwave housing and a microwave stub within said housing wherein said housing and said stub are arranged and dimensioned to resonate for microwave signals of a predetermined wavelength;

providing an aperture in said housing wherein said aperture has an aperture periphery and an aperture dimension across said aperture;

providing a lid that has a lid periphery and a lid dimension across said lid which exceeds said aperture dimension by a dimension differential;

providing one of said aperture periphery and said lid periphery with a corner;

providing the other of said aperture periphery and said lid periphery with a groove;

causing said housing and said lid to have a temperature differential that is sufficient to permit said lid to be positioned across said aperture with said lid periphery within said aperture periphery;

removing said temperature differential; and selecting said dimension differential to be sufficient, when said temperature differential removing step is completed, to abut said corner and said groove and elastically buckle said lid to thereby generate mutually-induced stresses in said housing and said lid that reduce passive intermodulation.

4. The method of claim 3, further including the step of providing one of said housing and said lid with a lip that extends over the other of said housing and said lid and, thereby, enhances the retention of said lid in said aperture.

* * * * *